(12) United States Patent
Georges

(10) Patent No.: US 7,176,372 B2
(45) Date of Patent: Feb. 13, 2007

(54) INTERACTIVE DIGITAL MUSIC RECORDER AND PLAYER

(75) Inventor: Alain Georges, Saint Paul (FR)

(73) Assignee: MediaLab Solutions LLC, Chicago, IL (US)

( * ) Notice: Subject to any disclaimer, the term of this patent is extended or adjusted under 35 U.S.C. 154(b) by 306 days.

(21) Appl. No.: 10/634,346

(22) Filed: Aug. 4, 2003

(65) Prior Publication Data

US 2004/0069121 A1    Apr. 15, 2004

Related U.S. Application Data

(63) Continuation of application No. 09/691,314, filed on Oct. 17, 2000, now abandoned, which is a continuation-in-part of application No. 09/690,911, filed on Oct. 17, 2000, now abandoned, and a continuation-in-part of application No. 09/691,302, filed on Oct. 17, 2000.

(30) Foreign Application Priority Data

Oct. 19, 1999    (FR)    ................................... 99 13036
Nov. 17, 1999    (FR)    ................................... 99 14420

(51) Int. Cl.
- *A63H 5/00* (2006.01)
- *G04B 13/00* (2006.01)
- *G10H 7/00* (2006.01)

(52) U.S. Cl. ........................................ 84/609; 715/727
(58) Field of Classification Search .................. 84/609, 84/600, 603, 625, 645; 434/307 A; 715/727, 715/850, 851
See application file for complete search history.

(56) References Cited

U.S. PATENT DOCUMENTS

| | | | |
|---|---|---|---|
| 4,399,731 A | 8/1983 | Aoki | ........................ 84/1.03 |
| 5,177,618 A | 1/1993 | Dunlap et al. | .............. 358/335 |
| 5,300,723 A | 4/1994 | Ito | ............................... 84/601 |
| 5,307,456 A | 4/1994 | MacKay | ..................... 395/154 |
| 5,386,081 A | 1/1995 | Nakada et al. | ................ 84/609 |
| 5,425,297 A * | 6/1995 | Young, Jr. | ................. 84/483.2 |
| 5,496,962 A | 3/1996 | Meier et al. | .................. 84/601 |

(Continued)

FOREIGN PATENT DOCUMENTS

EP    484047    10/1991

(Continued)

OTHER PUBLICATIONS

*Dream*, an Atmel Company: SAM9407, "Programmer's Reference," pp. 1-61, Rev. 11, Dec. 1996.

(Continued)

*Primary Examiner*—Jeffrey W Donels
(74) *Attorney, Agent, or Firm*—Loudermilk & Associates

(57) ABSTRACT

A digital multi-media device provides features for a user unskilled in musical arts or sound handling techniques that provides automatic musical score composition in accordance with contained composition instructions. Stored sound samples and interfaces for obtaining external signals provide signals for merger with visual and sound presentations to obtain altered presentations either time shifted or in real time. In this fashion the user can create simulated radio stations for playback of prearranged and composed audio material. Further, the automatically composed musical score may be mixed with synthesized, digitized signals from the stored sound samples and external signals obtained through the device interfaces.

20 Claims, 7 Drawing Sheets

U.S. PATENT DOCUMENTS

| | | | |
|---|---|---|---|
| 5,523,525 A | 6/1996 | Murakami et al. | 84/602 |
| 5,581,530 A | 12/1996 | Iizuka et al. | 369/93 |
| 5,590,282 A | 12/1996 | Clynes | 395/200.02 |
| 5,627,335 A | 5/1997 | Rigopulos et al. | 84/635 |
| 5,640,590 A | 6/1997 | Luther | 395/806 |
| 5,648,628 A | 7/1997 | Ng et al. | 84/610 |
| 5,655,144 A | 8/1997 | Milne et al. | 395/807 |
| 5,675,557 A | 10/1997 | Hubinger | |
| 5,689,081 A | 11/1997 | Tsurumi | 84/609 |
| 5,753,843 A | 5/1998 | Fay | 84/609 |
| 5,763,804 A | 6/1998 | Rigopulos et al. | 84/635 |
| 5,787,399 A | 7/1998 | Lee et al. | |
| 5,792,971 A | 8/1998 | Timis et al. | 84/609 |
| 5,801,694 A | 9/1998 | Gershen | |
| 5,824,933 A | 10/1998 | Gabriel | |
| 5,839,108 A | 11/1998 | Daberko et al. | |
| 5,864,868 A | 1/1999 | Contois | 84/609 |
| 5,877,445 A | 3/1999 | Hufford et al. | 84/602 |
| 5,886,274 A | 3/1999 | Jungleib | |
| 5,900,566 A | 5/1999 | Mino et al. | 434/307 A |
| 5,914,941 A | 6/1999 | Janky | |
| 5,928,330 A | 7/1999 | Goetz et al. | 709/231 |
| 5,969,716 A | 10/1999 | Davis et al. | 345/328 |
| 6,011,212 A | 1/2000 | Rigopulos et al. | 84/667 |
| 6,072,480 A | 6/2000 | Gorbet et al. | 345/302 |
| 6,074,215 A | 6/2000 | Tsurumi | 434/307 |
| 6,083,009 A | 7/2000 | Kim et al. | 434/307 |
| 6,093,880 A | 7/2000 | Arnalds | 84/600 |
| 6,121,533 A | 9/2000 | Kay | 84/645 |
| 6,182,126 B1 | 1/2001 | Nathan et al. | 709/219 |
| 6,225,547 B1 * | 5/2001 | Toyama et al. | 84/611 |
| 6,245,984 B1 * | 6/2001 | Aoki et al. | 84/611 |
| 6,429,863 B1 * | 8/2002 | LoPiccolo et al. | 345/419 |

FOREIGN PATENT DOCUMENTS

| | | |
|---|---|---|
| EP | 0702366 | 9/1995 |
| EP | 0747877 | 6/1996 |
| EP | 0857343 | 10/1996 |
| GB | 2306043 | 4/1997 |
| WO | WO 88/05200 | 7/1988 |
| WO | WO 89/02641 | 3/1989 |
| WO | WO 97/15043 | 4/1997 |
| WO | WO 97/35299 | 9/1997 |
| WO | WO 98/33169 | 7/1998 |
| WO | WO 01/63592 | 8/2001 |

OTHER PUBLICATIONS

*Dream*, an Atmel Company: SAM9707, "Integrated Sound Studio," pp. 1-20, Jan. 1998.

* cited by examiner

INTERACTIVE DIGITAL MUSIC RECORDER AND PLAYER

This application is a continuation of U.S. patent application Ser. No. 09/691,314, field Oct. 17, 2000 now abandoned which is a continuation-in-part of U.S. application Ser. No. 09/690,911 filed Oct. 17, 2000 now abandoned (which claims priority on French Patent Reg. No. 99 13036, filed Oct. 19, 1999) and Ser. No. 09/691,302 filed Oct. 17, 2000 (which claims priority on French Patent Reg. No. 99 14420, filed Nov. 17, 1999).

BACKGROUND OF THE INVENTION (a) Field of the Invention

The current invention relates to a device that provides for interaction with a user during recording, playing, composing and modifying musical selections.

(b) Description of Related Art

Various devices capable of composing a musical piece automatically have been developed, such as that described in U.S. Pat. No. 4,399,731. These devices are based on synthesizers of instrumental sounds on which are applied, for instance as per the MIDI (Musical Instrument Digital Interface) standard, "scores" of notes that are composed automatically. Various devices capable of recording or playing video recordings have already been developed, such as digital or analog camcorders and other video recorders. These devices can possess one or several audio inputs, which permit mixing or replacement of the sound track that was recorded originally during the recording of the image with an external audio source.

Furthermore, there also exist various devices that are capable of playing recorded pieces, such as digital compact disc players, players of compressed files (for instance as per the MPEG-level 3 standard), etc. Finally, there exist devices incorporating a tuner, which permit reception of radio broadcasts via electromagnetic waves.

SUMMARY OF THE INVENTION

An interactive digital multi-media device provides a user with multiple related features, wherein it is not necessary that the user have training in musical or sound handling arts. A programmable memory is used to store digital audio and voice samples. External sound recovers provide external sound signals, such as radio and TV signals that may also be stored. Playback means is provided connected to the stored audio and voice samples and the external sound signals. Automatic musical composition instructions are stored so that the user is able to create unique musical compositions. Components are provided that function to mix externally obtained sound with the unique musical compositions and stored audio and voice samples to provide altered audio and voice presentations.

The present invention includes an improved automatic composition device that adds to instrumental sounds some previously recorded sound samples wherein the sound samples are mixed with a melody in the process of the automatic composition. The sound samples will typically, but not exclusively, be human voice samples.

The invention herein further represents an improvement over prior art devices by integrating in a video recorder or player a module that generates music or other sounds which either can be mixed with the originally recorded sound (sound mixing), or can replace the originally recorded sound (sound dubbing). This sound mixing or dubbing can be performed either at video/audio record time or at play time.

Additionally the invention envisions selection of musical pieces either out of a library stored for instance in the form of digitized musical files, MIDI files or other types of files, or from pieces that are composed in a pseudo-random fashion using, for example, a synthesizer function to play original musical pieces.

The invention further envisions selection of musical pieces according to a specified musical style, in a pseudo-random fashion, or according to predefined criteria, wherein the audio files meet the predefined criteria and are either extracted from a music library or are generated by an automatic composition function. The resulting sounds are used either during the video recording or during the video playback.

The present invention represents an improvement of the aforementioned devices by simulating the reception of a radio station by the use of one or several of the aforementioned functions. Further, the invention permits selection of musical pieces, by a user, either from a library in which musical pieces are stored as compressed musical files, MIDI files or other similar types of files, from pieces recorded from the output of a radio receiver, or from pieces that are composed in a pseudo-random fashion using a synthesizer function to play original musical pieces.

Thus, the present invention provides for selection according to a pre-selected musical style, in a pseudo-random fashion or according to a pre-defined criteria, of audio files to be played from a speaker, wherein the audio files meet the pre-defined criteria and are either extracted from the library or generated by an automatic composition function. Further, the recording of or the automatic generation of sentences that mimic the speech of a "disc-jockey" or of an announcer permits combination of speech passages with the musical pieces being played, thereby giving the user the illusion that he is listening to an actual radio station.

BRIEF DESCRIPTION OF THE DRAWINGS

The above objects and other advantages of the present invention will become more apparent by describing in detail the preferred embodiments of the present invention with reference to the attached drawings in which.

DETAILED DESCRIPTION OF THE PREFERRED EMBODIMENTS

The present invention will be described in greater detail with reference to certain preferred and alternative embodiments. As described below, refinements and substitutions of the various embodiments are possible based on the principles and teachings herein.

The invention disclosed herein is an interactive digital music player that allows one or more users to listen to, compose, and interact with music in any environment. The device is a hand-held digital music player that offers numerous unique features that, until now, have not existed in a single music product. One of the many features, the Electronic DJ (e-DJ) automatically composes and plays in real-time music in a multitude of genres (such as a dance or techno), which can be mixed with user-supplied voice samples. The e-DJ offers a unique interactive way of playing with music. At any moment, the user can take the control of the music played by the e-DJ via an attractive interface (joystick, graphical display). The user can change the music patterns played by various instruments, change the relative level, apply effects, play pre-recorded samples, etc.

Further, the disclosed device allows the user to listen to, create, download, store, and interact with music, and includes an FM radio receiver. Users can listen to both compressed audio and MIDI karaoke music files, store music on a plug-in SmartMedia memory card (SSFDC storage device), and carry the unit to any location for playing. The device is capable of storing more than 1000 MIDI karaoke-file songs on a 64 MB smart media memory card and it can provide over 120 minutes of digital music play time. In addition, the disclosed device is able to create music files, accept music files created by the user, download music from the Internet via a PC, take a music transferred from a PC, or, accept music added from any other smart media memory card. When connected to a docking station, the device offers additional features like insertion of Karaoke lyrics in a video source for display on a TV screen, MIDI PC connection or remote control.

Figure 1:
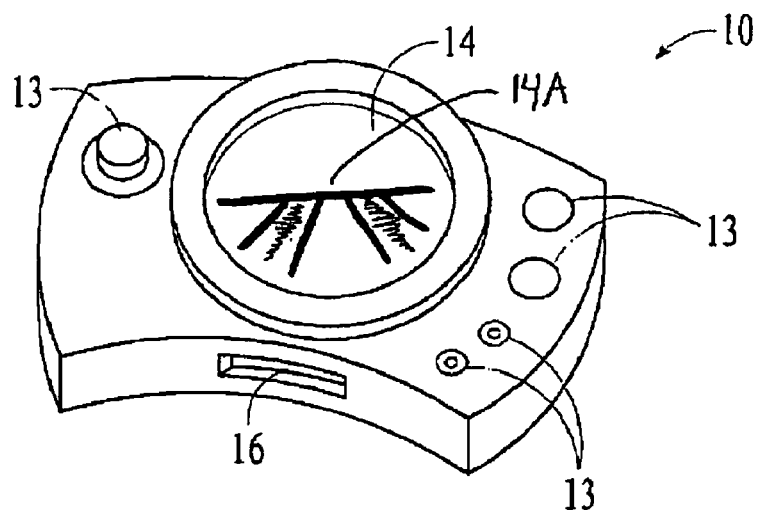
FIG. 1 is a perspective of the digital multi-media device of the present invention.
Figure 1:
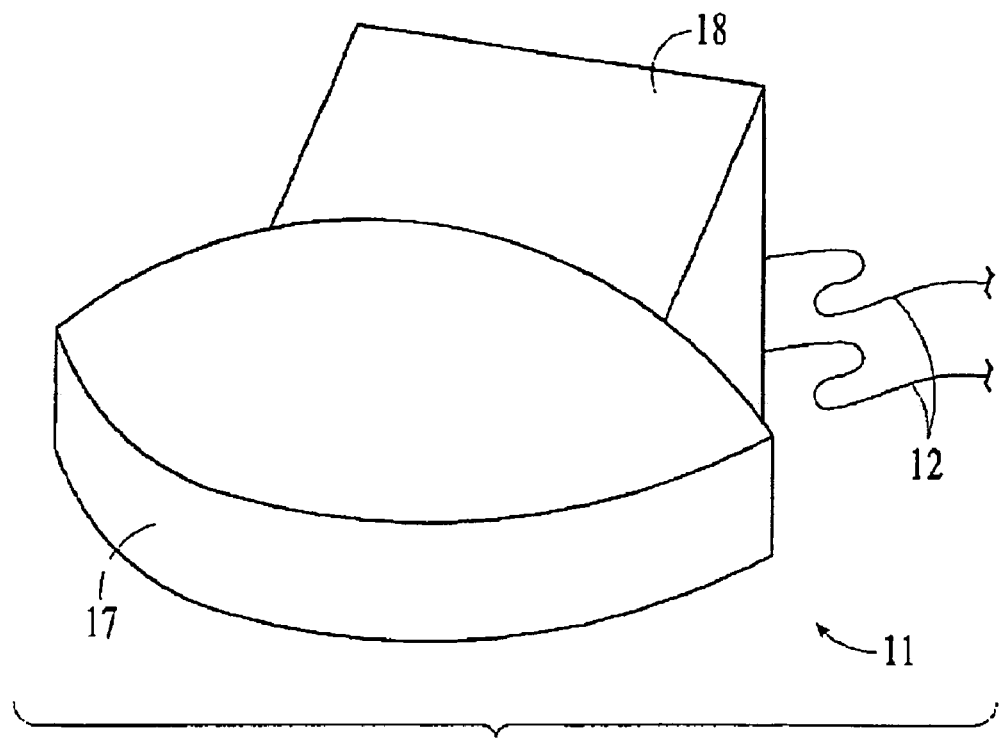

FIG. 1 shows the device 10 and its docking station 11. A number of cables 12 are shown for connection to a number of ports (not shown) situated at the rear of the docking station 11. The device 10 as shown has a group of controls 13, including buttons, knobs, jacks, etc. and a display 14 on its front surface. A connector within a slot 16 is shown on the device that is configured to mate with a connector (not shown) on a rear surface of a base 17 on the docking station 11. The docking station includes an inclined surface 18 that supports the device in the docking station when connection is made between the connector in slot 16 and the connector in the docking station.

Figure 2:
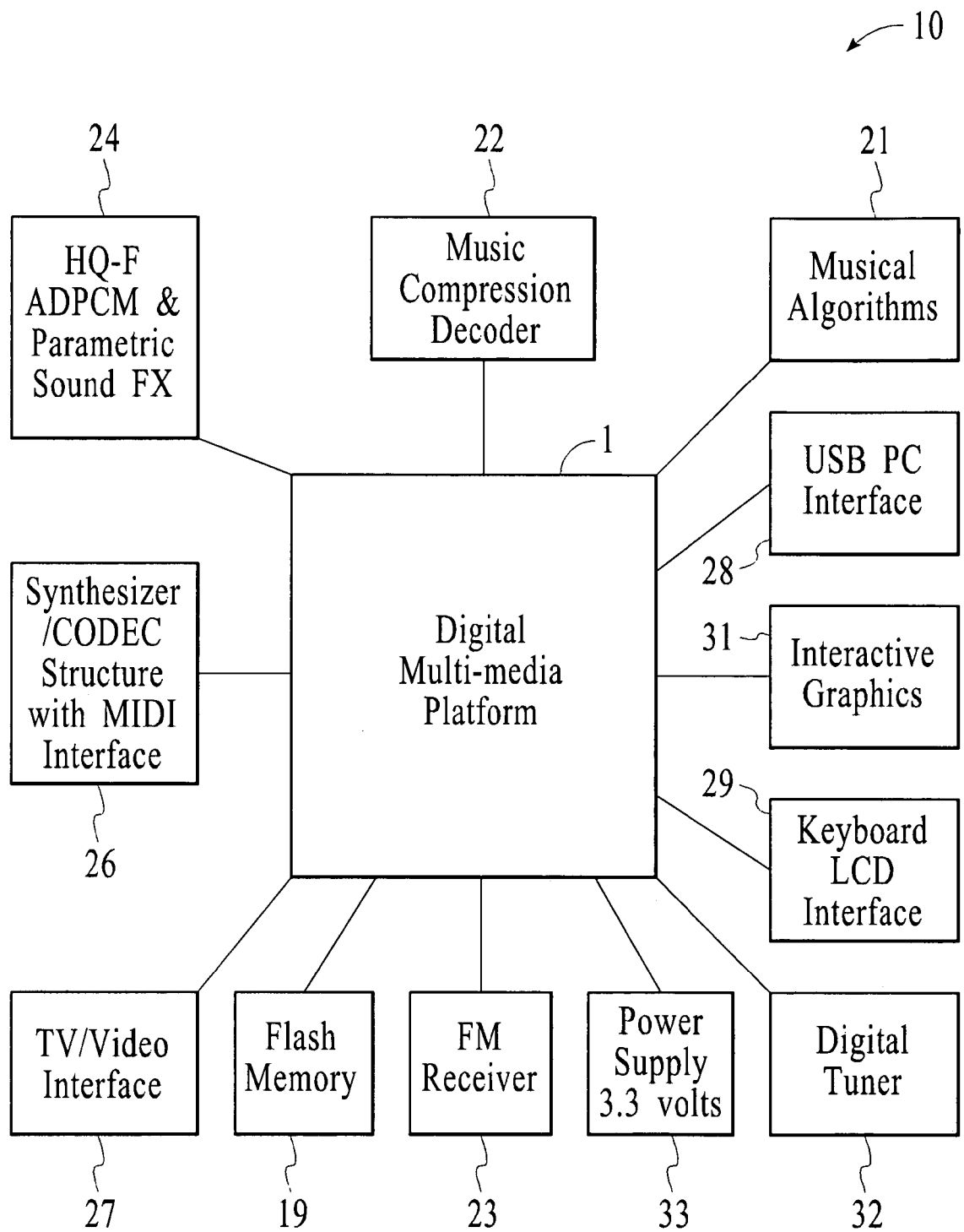
FIG. 2 is a functional block diagram of the present invention.

The device 10 is shown in the block diagram of FIG. 2 and will be referred to as a Digital Multi Media Platform (DMM) hereinafter. A large number of features are included in the DMM, one of which is the ability to playback digital audio data from a SmartMedia memory card 19. The digital audio source is either compressed or MIDI. The DMM offers a user the capability to interact with a song being played by changing pitch and tempo. The audio compression techniques supported in the DMM is Microsoft Windows Media Audio (WMA), illustrated at 22 in FIG. 2, having files in the active streaming format (ASF). WMA provides a higher compression ratio for equivalent sound quality as compared to previous compression techniques, i.e., MP3. DMA compression techniques allow a compression ratio approximately twice that of MP3, thereby allowing for over two hours of music to be stored on a 64 megabyte SmartMedia card. The WMA playback function supports the Digital Rights Management (DRM) technology that is used with audio files. This technology can be used to encrypt the compressed data, which can then only be decoded correctly with a private key. As a result, a user can download music from the Internet that is protected with the DRM technology and receive rights to play music on a particular DMM that has been previously registered. ASF and MIDI files can be copied on the SmartMedia card either via a serial PC connection offered by the DMM device or directly with an off the shelf SmartMedia card reader. Internal memory and SmartMedia memory 19 further provides the ability for the DMM to obtain firmware and sound upgrades from the Internet.

An electronic DJ and virtual radio functions are provided by a group of musical algorithms 21 that allow a user to automatically create and play many different types of music such as dance, techno, rap, easy listening, etc. Unlimited hours of random music may be generated by the musical algorithms. The device also operates as a musical composer assistant. An FM receiver 23 is provided in the DMM so that a user is able to tune to a favorite radio station or to a virtual radio station. While music is playing a user is able to take control over automatic composition being undertaken by the musical algorithms 21 and to add the users own touches. The user may interact with the music being played by way of changing the tempo and pitch. Consequently, interaction is available in as much as the user is able to play voice, music or sound samples that can be recorded with a built in microphone or obtained from the FM radio receiver or any other source. The samples are obtained through the use of a high quality audio compression circuit 24 and are stored in the SmartMedia memory section 19. The controls 13 on the face of the DMM (FIG. 1) provide for introducing the sound effects such as wobbler, dobbler, etc. and can be applied at a user's will during playback of the recorded samples. Additionally the controls allow the user to take even more control over the musical content by selecting relative volume of an instrument or a group of instruments in a fashion normally only possible through the use of a mixing table. The sound of a particular instrument may be altered using filters and also may be saved to be later played over again and even to be edited later. Controls 13 are intuitive using traditional player keys while the graphical display of 14 provides visual feedback in real time of the action the user is undertaking with the musical content. As a result users with no special musical education or skill are able to alter and compose music to their own designs.

Audio compression circuit 24 preferably is a circuit based on a speech compression algorithm using, for example, adaptive differential pulse coded modulation (ADPCM) that can be applied to a useful portion of the recording. As is known in the art, techniques such as PCM and ADPCM provide methods of compression of analog data that has been sampled and digitized, typically in which the samples have been digitized, and difference between samples are stored/sent (rather than the samples themselves), or with adaptive techniques a predicted sample/sample difference is computed, and what is stored/transmitted is the difference between the predicted value and the actual value, etc. Such compression techniques are known in the art and used, for example, in various telephony-type systems.

A built in microphone (not shown) in the DMM is used for Karaoke and DJ functions. Further, it is used with a music synthesizer 26 to provide for audio mixing and other audio sound effects. The synthesizer 26 provides a MIDI interface whereby, due to the small size of a MIDI file, a large number of songs may be made to fit in the flash memory 19 containing the SmartMedia cards. The SmartMedia Flash memory provides for storage of compressed digital/audio MIDI/Karaoke files and voice samples. This is currently the most compact Flash Memory form available. The digital nature of the MIDI files allows tempo and pitch of music to be dynamically adapted to the users requirements. Moreover, when a singer's voice is taken from the built in microphone within the DMM and mixed with synthesized or stored sound samples, lyrics may be displayed on a TV/video interface 27 or on the display 14 of FIG. 1. An external microphone may be plugged into the DMM for even more flexible usage.

When the DMM is connected to the docking station 11 and playing MIDI or Karaoke songs, a digital light show is available through the TV/video interface 27. The resulting colorful patterns have movements and shapes following the beat of specific instruments or serve as a compliment to lyrics displayed on the screen 14 or just as a visual assist to the electronic DJ music.

A universal serial connection 28 to a personal computer allows transfer of audio files to and from the SmartMedia/flash memory 19. Additionally the serial connection is available to perform a firmware upgrade. The MIDI interface 26 in the DMM 10 converts to a synthesizer when connected to a MIDI sequencer through the USB PC interface 28. Firmware for the DMM is stored in the Flash Memory and can therefore be upgraded readily by a user by downloading through the MIDI PC interface 28. A digital instrument tuner for all modern and classical instruments is shown in FIG. 2 at 32.

The compact design obtained in the DMM to afford the portable nature of the device is obtained by housing some functions required only when using the product in a non-mobile environment to be placed in the docking station 11 of FIG. 1. These functions include the circuitry required for the insertion of Karaoke lyrics in a video source and for display on a TV screen as well as an external microphone connection for Karaoke recording. A MIDI in/out interface is provided in the docking station 11 for connection to a personal computer or to another MIDI device. A power jack and charge control (not shown) is provided at the rear of the docking station to provide the DMM with a 3.3 volt power supply in a preferred embodiment as shown at 33 in FIG. 2. The DMM is configured to include two AA batteries. These may be rechargeable or regular batteries. Multiple functions are provided through controls 13 on the DMM such as compressed audio playback, electronic DJ, voice and sound samples and radio. Playback and record keys are available on the face of the DMM together with general volume control keys. Power, video and audio connectors, and microphone input connectors are provided on the docking station 11. Additionally, the docking station has a standard MIDI interface with in and out connectors. This interface is useable for communication with a personal computer for audio file transfer or firmware upgrade.

The invention disclosed herein is useable by persons having no appreciable musical expertise. It presents a new way of listening to music wherein a user may modify existing music, compose new music, and save and play back music. Music patterns composed by the user or taken from favorite composers may be retained in a music database or library. The composition device of the present invention utilizes a combination of notes rather than sounds. Notes, being represented digitally, require less memory for storage than sounds that are usually represented in analog form and take large amounts of memory, comparatively, when digitized.

Further, digital notes are easily altered while digital sounds are not readily changed. As a result, the instant invention may use a microprocessor operating at about 25 MHz and needs only about two (2) megabytes of storage, although, of course, the particular clock speed and storage size are exemplary embodiments and the invention is not limited thereto. This may be seen to be much less processor speed and memory than used in the least capable desktop computer, for example.

Figure 3:
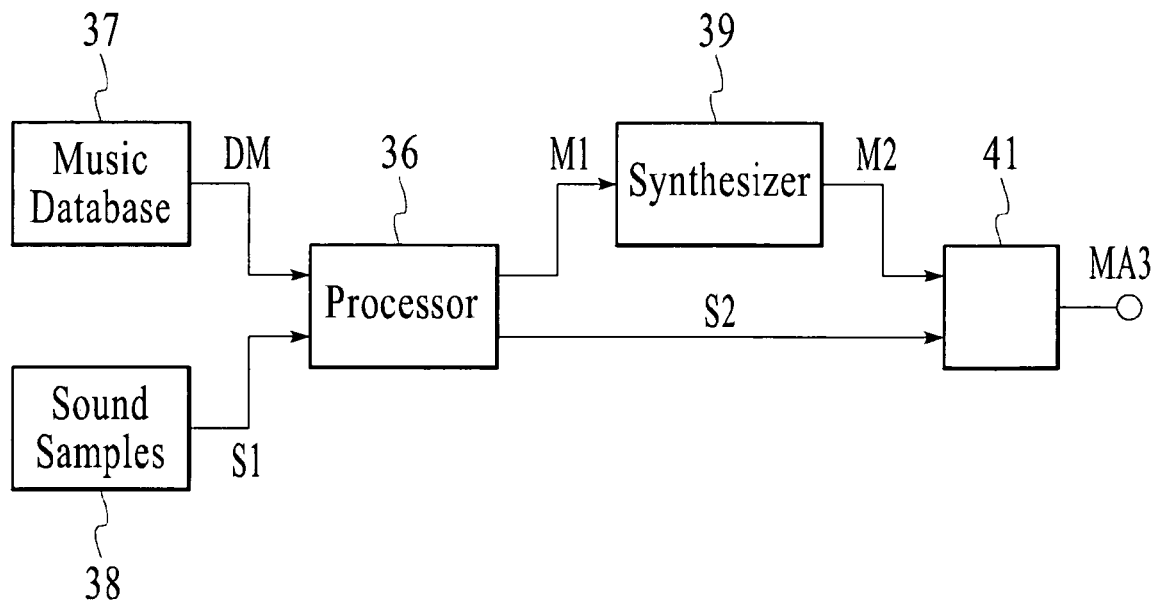
FIG. 3 is a block diagram of the automatic composer of the present invention.

According to the functional diagram of FIG. 3, one typical embodiment of the automatic composition device of the present invention includes essentially a processor 36, a memory 37 containing a music database for use in the automatic composition device, a memory 38 for storing sound samples utilized by the automatic composition device, a music synthesizer 39, and a summation and digital to analog conversion circuit 41 interconnected as shown. Processor 36 is able to compose automatically a melody out of the database stored in memory 37 using an automatic composition algorithm containing composition instructions. The automatic composition algorithm also utilizes the sound samples stored in memory 38, in such a way that processor 1 delivers in synchronism on its output a control signal M1 connected to synthesizer 39 and a sound sample signal S2. An output signal M2 of the synthesizer and sound sample signal S2 are then summed and converted to analog form in circuit 41 to deliver the complete audio signal MA3. This audio signal MA3, which forms the output of the invention, can then be presented in audio form by a stereo sound system.

In a preferred embodiment of the invention, the processor is made of a microprocessor or microcontroller having a synchronizing clock and being linked to one or several memories. Clock speed and memory capacity may be relatively low, 25 MHz and 2 MB being ample in the preferred embodiments. A RAM memory (volatile memory) can serve as the working memory of the microprocessor and can be used to store the sound samples in memory 38, whereas a ROM or EPROM memory can store the microprocessor program and the music database in memory 37 used by the automatic composition device. However, a greater flexibility will be granted by non-volatile memories: RAM memory saved by a disposable or rechargeable battery, or Flash EEPROM memory (electrically erasable). The non-volatile memory can be used at the very least to store the sound samples in memory 38, so that they are saved when the invention is powered off. It can also be used to store the music database in memory 37 for use by the automatic composition device, as well as a microprocessor operating program. This permits easy update of the music database and the microprocessor operating program by means of downloading updates.

The summing of output signal M2 of the synthesizer and of sound sample signal S2 is obtained using various methods and circuitry described as follows.

Figure 4:
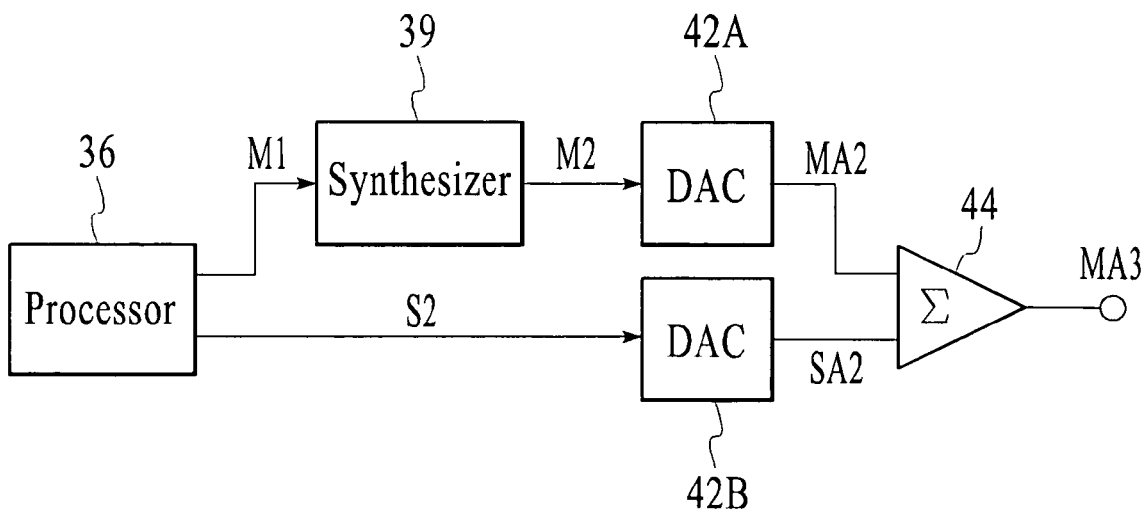
FIG. 4 is a block diagram showing one structure for summing outputs in the present invention.

In a first scheme for performing the summing of M2 and S2 (FIG. 4), output signal M2 of synthesizer 39, which is a digital signal, is converted to an audio signal MA2 by digital to analog converter 42A. Sound sample signal S2 generated by processor 36, which is also a digital signal, is separately converted to an audio signal SA2 by a second digital to analog converter 42B. Then audio signals MA2 and SA2 are summed by analog adder 44 to deliver an audio output signal MA3. The analog adder 44 can consist of an operational amplifier mounted in an adder configuration.

Figure 5:
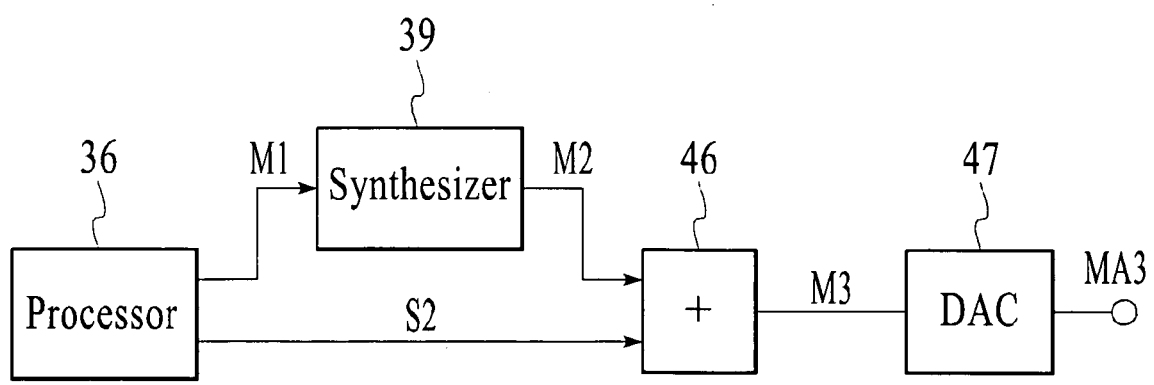
FIG. 5 is a block diagram showing another structure for summing outputs in the present invention.

In a second manner of performing the summing of M2 and S2 (FIG. 5), output signal M2 of synthesizer 39 and sound sample signals S2 generated by processor 36 are added by digital adder 46 to form a combined digital signal M3. This digital signal is then converted to an audio signal MA3 by a digital to analog converter 47. While this manner of performing the summing requires only one digital to analog converter 47, it nevertheless requires a digital adder 46.

Figure 6:
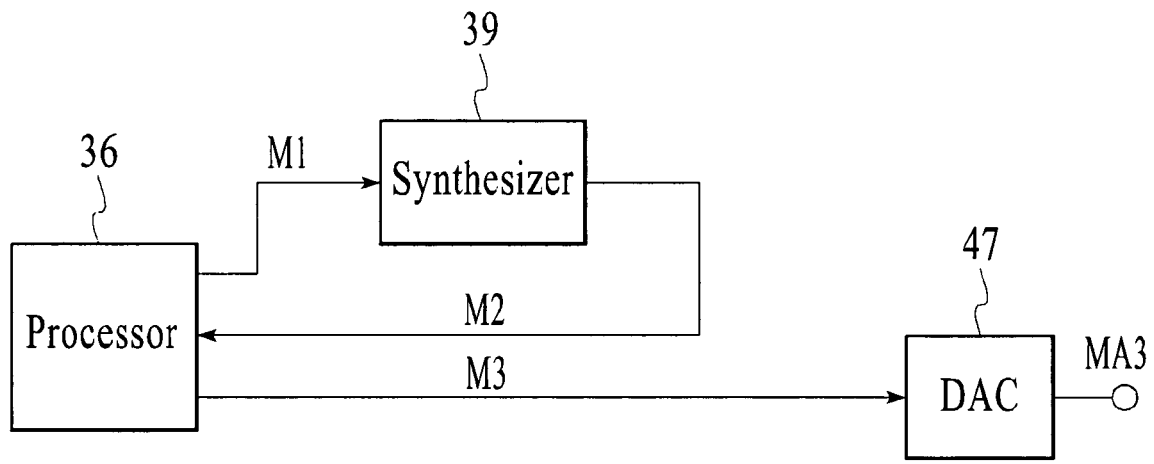
FIG. 6 is a block diagram showing a first variant of the diagram of FIG. 3.

In a variant of the second manner of performing the summing of M2 and S2 (FIG. 6), output M2 of synthesizer 39 is sent back to processor 36, which then performs by itself the summing of digital signals M2 and S2 (in this variant, signal S2 only exists in a virtual form in the processor). Thus, the processor delivers directly on output M3 the compound digital signal, which is converted to an audio signal MA3 by digital to analog converter 47. This variant requires only one digital to analog converter and does not require a specific digital adder circuit, but conversely it requires an additional input on the processor to read the output of the synthesizer.

Figure 7:
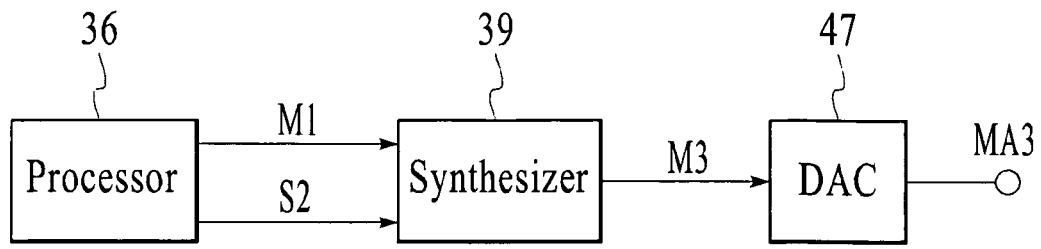
FIG. 7 is a block diagram showing a second variant of the diagram of FIG. 3.

In a second variant of the second manner of performing the summing of M2 and S2 (FIG. 7), which is applicable to the case where synthesizer 39 itself comprises a processor (microprocessor and/or digital signal processor), the summing of digital signals M2 and S2 can be performed by the synthesizer modified for this purpose. Indeed, either the synthesizer has an additional input to read signal S2 as shown in FIG. 7, or signals M1 and S2 are multiplexed on a single input of the synthesizer (variant not shown on a figure). In the latter case, if a MIDI standard protocol is used, the multiplexing of signals M1 and S2 will be made much easier by putting the information relevant to sound sample signals S2 in "System Exclusive" MIDI messages. Thus, the synthesizer performs internally the summing of signals M2 and S2 (in this variant, signal M2 only exists in a virtual form in the synthesizer) and delivers directly on output M3 the compound digital signal, which is converted to an audio signal MA3 by digital to analog converter 47. This second variant also requires only one digital to analog converter and does not require a specific digital adder circuit, but conversely, compared with a standard synthesizer circuit, it requires a modification of the synthesizer to read and add sound sample signals S2.

Figure 8:
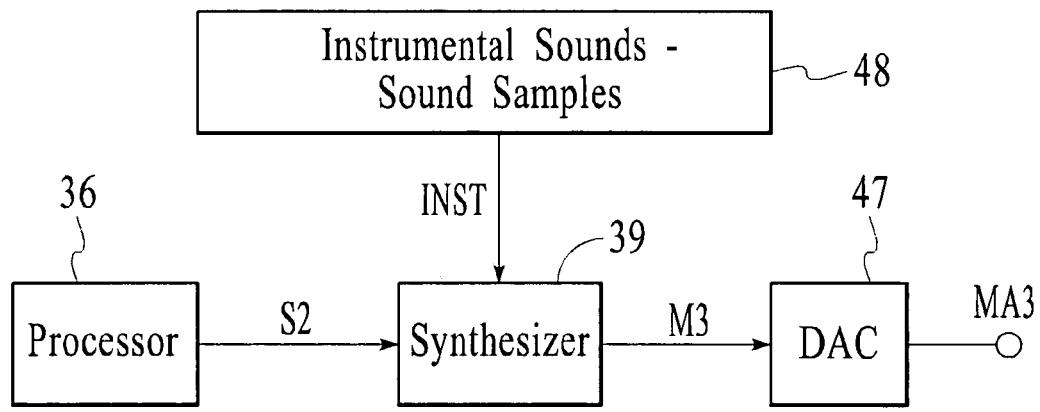
FIG. 8 is a block diagram of another embodiment of the automatic composer of the present invention.

In another preferred embodiment of the invention, applicable to the case where synthesizer 39 itself comprises a processor, memory 38 for storing sound samples is linked to synthesizer 39 instead of processor 36. Given that synthesizer 39 already possesses a memory that contains instrumental sounds that are used as basic units for music synthesis, a variant of this embodiment consists in storing the two types of sounds, i.e., the basic instrumental sounds and the sound samples, in a sounds memory 48 as shown in FIG. 8. In this embodiment, the summing of digital signals M2 and S2 is naturally performed by the synthesizer, according to the same process as described for the variant of FIG. 7. Thus, the program executed by the processor of the synthesizer 39 is modified to permit these new operations (storing sound samples and summing them with instrumental sounds). The program modifications performed by the processor of the synthesizer can be minimized by organizing the program in such a way that the synthesizer processes sound samples as a special case of basic instrumental sounds; for example, as by assigning a MIDI channel to the sound samples or as an alternative by defining the sound samples as special notes of a percussion type instrument.

Figure 9:
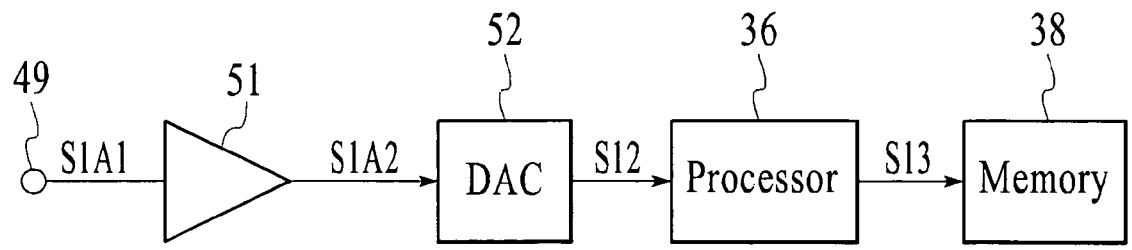
FIG. 9 is a block diagram of a variation of the present invention.

In a preferred embodiment of the invention, the invention allows a user to record sound samples with a microphone via commands that permit the user to start and stop a recording. An internal microphone and/or an external microphone input is required. As seen in FIG. 9, a microphone 49 provides an output S1A1 connected to the input of preamplifier 51. An analog to digital converter 52 converts the microphone signal S1A1 to digital sample signals S12. The sample signals are read by processor 36 and stored either in its memory 38, or, in the case of the embodiment of FIGS. 7 and 8, in the memory contained within the synthesizer 39. The memory may be RAM or flash as indicated previously.

Various processes may optionally be used to reduce the memory requirements to store the samples. The following examples are not limiting:

(a) once the recording is over, the silent periods which precede and follow the useful portion of the recording can be eliminated automatically;

(b) a speech compression algorithm such as Adaptive Differential Pulse Coded Modulation (ADPCM) 24 can then be applied to the useful portion of the recording.

In the process of automatic composition of music, the processor can treat the sound sample signals as a special case of a musical instrument. Thus, the association of sound sample signals with the notes sent by the instruments is an integral part of the automatic composition process. The processor then extracts information from the available pool of sound samples in the same way as from the music database.

However, the processing of sound samples has certain features. First of all, the invention is not restricted to using sound samples that have been pre-recorded for a given type of instrument, but also envisions using sound samples that have been recorded freely by the user. In addition to some special effects that will be described later, the processing of sound samples consists of selecting a sample in the pool of available samples according to a pseudo-random sequence, then selecting the moment to start playing the sample, taking into account the melody that the processor is simultaneously composing, in such a way that the sample starts at the beginning of a musical bar, or in specific cases at another moment that is governed by certain musical laws (which may depend on the music style). The sound sample can then be played either in its entirety or in part, and it can be repeated or not repeated.

Furthermore, the sound samples may be modified to include various special effects depending on the style of music created by the automatic composition device. To quote only a few of such special effects: echo addition, vibrato, distortion, frequency modulation, various filtering processes to shape the sound spectrum, etc.

Figure 10:
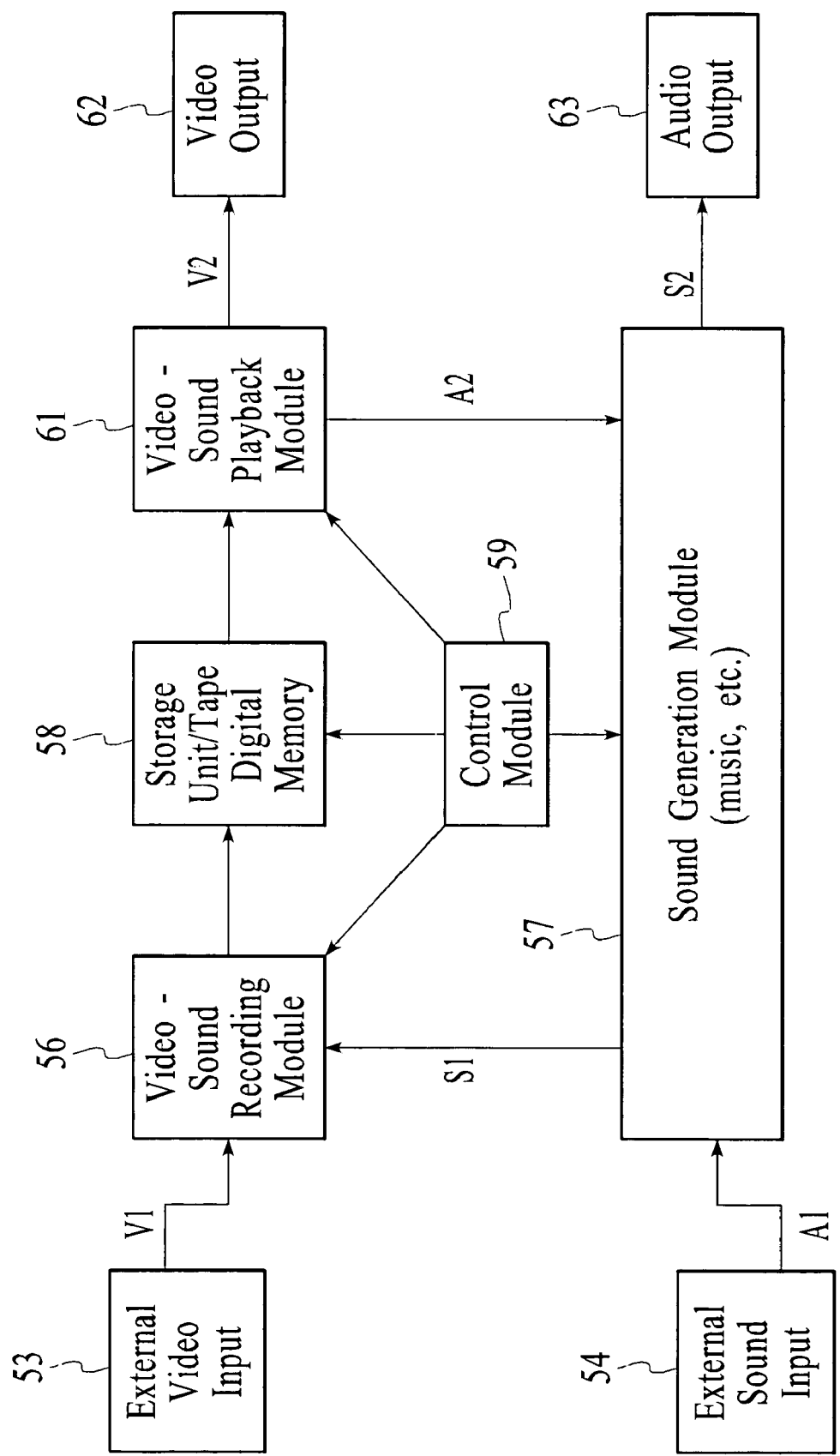
FIG. 10 is a block diagram of another aspect of the present invention.

One aspect of the current invention relates to a system such as described above that also may include, or be included in, an automatic soundtrack generator that operates to merge an independent sound track with a video sequence during recording or playback of the sequence (aspects of the other embodiments described herein could be used to record or playback desired audio tracks in conjunction with video that being recorded and/or played back, etc.). FIG. 10 represents a system in block diagram form showing an external video input 53 providing a signal V1 to a video and sound recording module 56 connected to store the signal V1 on storage unit 58 such as a tape or a digital memory. The storage unit is connected to a video and sound playback module 61 that produces an output V2 connected to a video output module 62 and an audio output A2 connected to a sound generation module 57. Items 56, 58, 61 and 62 are generally contained in a commonly known camcorder device. The camcorder device also includes an external sound input element 54, such as a microphone, producing an audio output A1. Output A1 is also connected to sound generation module 57. A control module 59, shown connected to items 56, 58, 61 and 57 in FIG. 10, selects sounds generated by sound generation module 57 to produce output S2 providing audio output 63.

Figure 11:
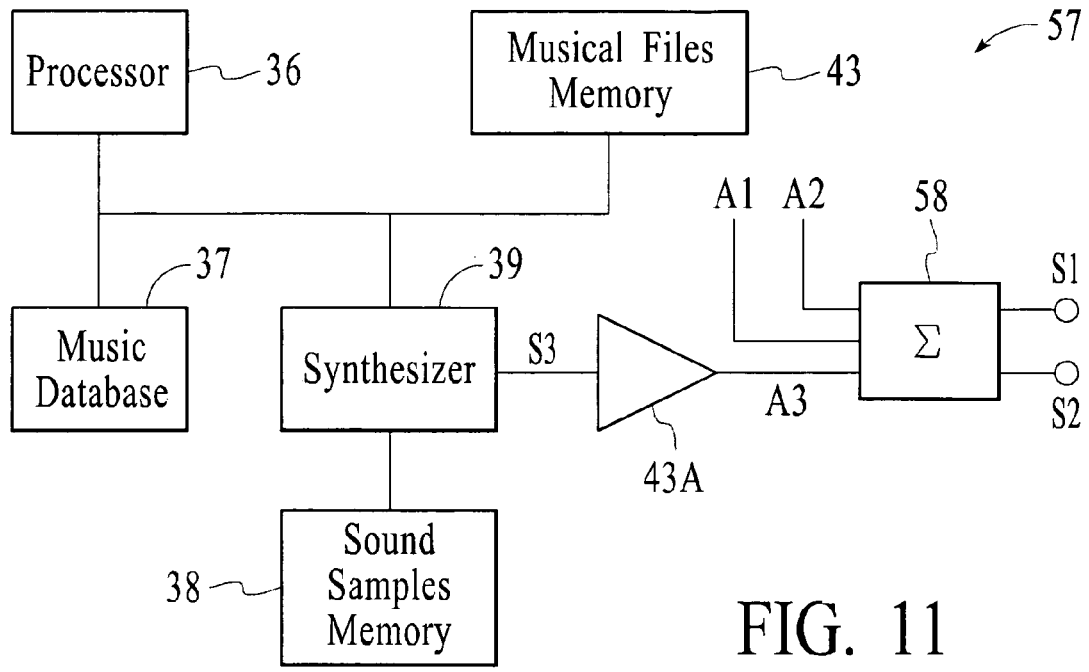
FIG. 11 is a block diagram of an additional aspect of the present invention.

According to the functional diagram of FIG. 11, the invention can typically be embodied by a module that generates music or other sounds and which comprises essentially processor 36, memory 37 containing the music database of the automatic composition device, musical synthesizer 39, memory 38 storing the sound samples for the musical synthesizer, a digital to analog conversion circuit 43A, a summation circuit 58 and a memory 43, internal or external to the invention, containing a library of digitized musical files. The memory elements 37, 38 and 43 can be made of one or several distinct physical components. Processor 36 is able to select, according to certain criteria that are pre-defined or defined by a user, musical files out of the library in memory 43, or is able to compose automatically a melody out of the database stored in memory 37, with an automatic composition algorithm. The output signal S3 of the synthesizer, after digital to analog conversion in converter 43A, delivers an analog signal A3 which can optionally be mixed with the recorded audio A2 or with the external audio input A1 in summation circuit 58 to deliver the mixed complete audio signal S1/S2. This mixed audio signal S1/S2, which forms the output of the invention, can then be used as a sound source at video/audio record time (real time) (S1) or at play back time (time shifted) (S2). As a result prerecording of movie soundtracks, for example, is unnecessary. A simple way is provided for a user to change sound content, pitch, etc. for implementation in a video soundtrack.

In a preferred embodiment of the invention, the processor 36 is made of a microprocessor or microcontroller linked to one or several memories. A RAM memory (volatile memory) can serve as the working memory of the microprocessor, whereas a ROM or EPROM memory can store the microprocessor program and the music database 37 of the automatic composition device. However, a greater flexibility will be granted by non-volatile memories: RAM memory saved by a disposable or rechargeable battery, or Flash EEPROM memory (electrically erasable). The non-volatile memory can be used to store the music database 37 of the automatic composition device and the digitized musical files of the library in sound samples memory 38, as well as the microprocessor program. This permits easy update for the music database and the microprocessor program.

The synthesizer 39 and the microprocessor 36 of FIG. 11 cooperate to select banks of sound samples according to predetermined processor instructions to provide the synthesizer output S3. The sound sample banks contain sounds in digital form of predetermined instruments.

The processor 36 can also be used to select the sound source or sources described above. Furthermore, the processor can be used to select commands which permit activation functions such as playing a recording, selecting and mixing an audio source, or controlling any other functions that are commonly found in video recorder based equipment. This combines the functions of blocks 57 and 59 of FIG. 10.

Figure 12:
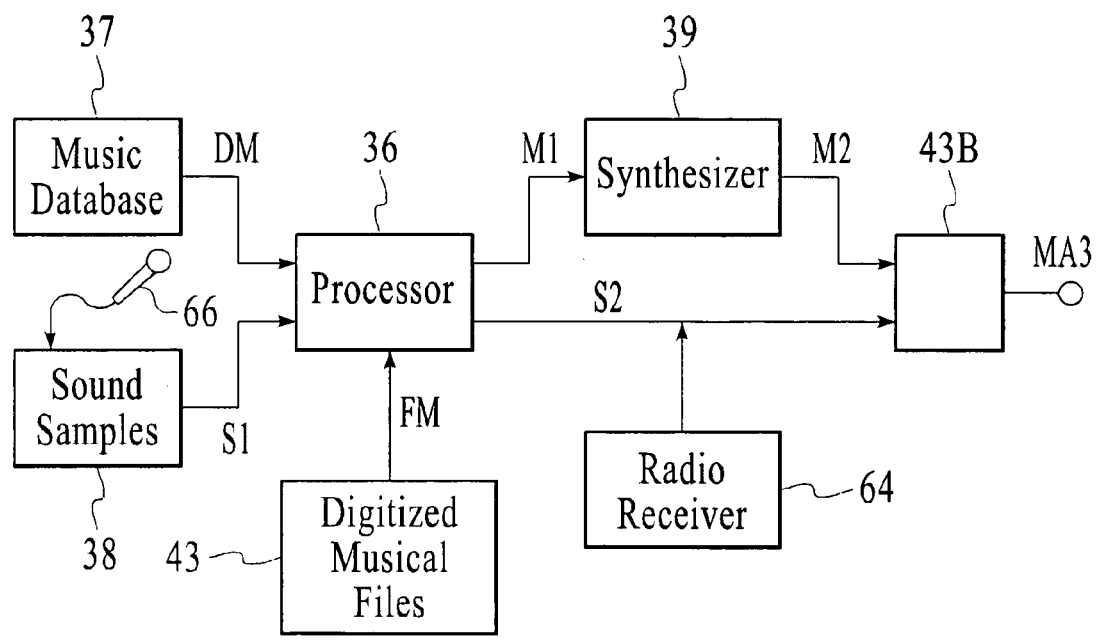
FIG. 12 is a block diagram of yet another aspect of the present invention.

According to another feature of the present invention, a device is provided that simulates a radio station including a player of musical pieces, either recorded and digitized or synthesized. According to the functional diagram of FIG. 12, a typical embodiment of the invention comprises essentially a processor 36, a memory 37 containing a music database for use by an automatic composition algorithm, a memory 38 storing the sound samples, a musical synthesizer 39, a summation and digital to analog conversion circuit 43B, a radio receiver 64 and a memory 43, internal or external to the invention, containing a library of digitized musical files, wherein these elements are interconnected as shown. The memory elements 37, 38 and 43 can be made of one component or several physically distinct components. Processor 36 is in communication with the memory elements and is able to select, according to certain criteria, musical files out of the library of musical files or is able to compose automatically, according to the automatic composition algorithm, a melody out of the database stored in memory 37. The automatic composition algorithm also utilizes the sound samples stored in memory 38, which may include some speech sentences, in such a way that processor 36 delivers in synchronism on its outputs a control signal M1 connected to synthesizer 39 and a sound sample control signal S2. Output signal M2 of the synthesizer and sound sample control signal S2 are then summed and converted to analog form in circuit 43A that provides the complete audio signal MA3 for connection to a speaker or speakers (not shown). In a similar way, the output of radio receiver 64 can be mixed upstream, as a digital signal, or downstream, as an analog signal, of circuit 43A to add a supplementary sound source to the complete audio signal MA3. The audio signal MA3 forms the output of the invention that can then be played by the aforementioned speakers in a stereo system.

In a preferred embodiment of the invention, the processor is made of a microprocessor or microcontroller linked to one or several memories. A RAM memory (volatile memory) can serve as the working memory of the microprocessor and can be used to store the sound samples 38, whereas a ROM or EPROM memory can store the microprocessor program and the music database 37 used by the automatic composition algorithm. However, a greater flexibility will be granted by non-volatile memories: RAM memory saved by a disposable or rechargeable battery, or Flash EEPROM memory (electrically erasable). The non-volatile memory can be used at the very least to store the sound samples in memory 38, so that they are saved when the invention is powered off. It can also be used to store the music database in memory 37 for use by the automatic composition algorithm, the digitized musical files of the library 43, as well as a microprocessor operating program. This permits easy update of the music database and the microprocessor operating program by means of downloading updates.

Processor 36 can also be used to select the sound source or sources, including radio receiver 64 or one of the sources in memories 37, 38 and 43 described above. It can also be used to select one of a number of preset radio stations, including either actual radio stations or illusory radio stations. Illusory stations in reality play sound samples and musical pieces that have been stored in digital form or that are composed automatically as described herein. Moreover, a sound input device, such as a microphone 66, is useful to input voice signals, encoded in memory, to be used in construction of illusory radio station sound patterns.

The controls 13 to which reference was made in FIG. 1 include a joystick and a number of direct access keys to simplify entry into various interactive modes by users of the DMM device of the present invention. Certain operating sequences for specific interactive modes will now be described.

To enter Electronic-DJ, press the [e-DJ] direct access key. The LCD will display "E-DJ" in the status line and a selection of music styles is proposed: Techno, Dance, Hip-Hop, etc.

To select the desired style, use Joystick Up/Down

To start playing auto-composed music of the selected style, press the play/pause key the LCD will display the music I-way screen representing six instrument lanes: Drums, Bass, Riff, Lead Samples and Microphone. The screen is animated with sound waves or pulses synchronized with music beats.

Referring again to FIG. 1, display 14 preferably displays music tunnels, lanes, sound waves, beat pulses, etc. as described elsewhere herein, such as is generally illustrated by display feature 14A.

To change music tempo, press Pitch/Tempo key together with joystick left to speed up or right to slow down.

To change music pitch, press Pitch/Tempo key together with joystick left to speed up or right to slow down.

To change music pitch, press Pitch/Tempo key together with joystick up to higher the pitch or down to lower it.

Press play/pause to pause the music.

Press stop to stop the music and go back to style selection screen.

Press forward to start a new song.

Press backward to restart the current song.

Press Save/Edit key to save the current song as a user song on the SmartMedia card.

To select a specific lane, use joystick left/right. The image on the screen will shift left or right and present the I-way seen from the new lane.

To change the relative volume of the current lane, press Effects key together with the joystick up or down.

To change the reverb on the current lane, press Effects key together with the joystick left or right.

To enter the Underground mode for the current lane and loop the current sequence, press joystick down.

The transition to music tunnel is marked by a screen animation and the under ground mode is entered for the selected instrument or sound source (sample or microphone). The U-ground screen shows the inside of a tunnel with sound waves on both sides and beat pulses coming towards the user. The shape of the far side of the tunnel is modified with the sound effect applied.

The music will loop as long as the user remains in the Underground mode.

In Instrument Tunnels (Drums, Bass, Riff and Lead):

Use Joystick right to select a new music pattern. Use joystick left to come back to previous patterns.

Press Joystick up to go back to music I-way.

To change the cutoff frequency of the filter on the current instrument, press Effects key together with joystick up or down.

To change the resonance of the filter on the current instrument, press Effects key together with joystick left or right.

Press stop to mute the instrument.

Press play/pause to un-mute the instrument.

In the Sample Tunnel:

Use Joystick left/right to select a sample.

Press Joystick up to go back to music I-way.

To change the sample volume, press Effects key together with joystick up or down.

To choose a different sample effect, press Effects key together with joystick left or right.

Press play/pause to play the sample. If sample playback had been previously disabled (see below), the first press on play/pause will re-enable it. Following presses will play the selected sample.

Pressing stop will disable the automatic playback of samples by the e-DJ when returning to I-way mode.

In the Microphone Tunnel:

Use Joystick left/right to select the active microphone: built-in or docking station. If the docking station is not connected, no selection is available.

Press Joystick up to go back to music I-way.

To change pitch on the microphone input, press Pitch/Tempo key together with joystick up or down.

To change the microphone volume, press Effects key together with joystick up or down.

To modify the microphone echo, press Effects key together with joystick left or right.

Press stop to mute microphone.

Press play/pause to un-mute the microphone.

To exit Electronic-DJ mode, choose any other mode by pressing the appropriate direct access key.

Playback of compressed audio and Karaoke is accessible in the "Songs" mode. This mode allows to play digitally recorded WMA (MP3) songs, MIDI songs, Karaoke songs and User songs saved during an e-DJ session.

To enter Songs mode, press the [Songs] direct access key. The LCD will display "e.Songs" in the status line and a list of available songs or song lists on the SmartMedia card to choose from. Song lists are identified by a specific icon.

To select the desired song or list, use Joystick Up/Down.

To start the playback of selected song or song list, press the play/pause key. The LCD will display the play song screen. The name of the song is scrolling in a banner in the center right part of the LCD while the audio output level is materialized by a frame around the name which size is changing following the audio level. The status line shows the elapsed time.

If the song is a Karaoke song, the Lyrics are displayed at the bottom of the LCD. Note: if the song is a user song (composed with the e-DJ), the music I-way mode is entered instead of the play song mode.

To change music tempo, press Pitch/Tempo key together with joystick left to speed up or right to slow down.

To change music pitch, press Pitch/Tempo key together with joystick up to higher the pitch or down to lower it.

Press play/pause to pause the music. Press play/pause again to resume playback.

Press stop to stop the music and go back to song selection screen.

Press forward to go to next song.

Press backward to go to previous song.

Pressing the Save/Edit key in the song select screen or while a song is playing enters the song edit mode. Depending on the type of the song (user song, MIDI or WMA), different parameters can be edited.

Pressing the Save/Edit key in the song select screen while the current item is a song list enters the song list edit screen. See "Editing items" below.

Pressing forward key in the song select screen will create a new song list.

To exit Songs mode, choose any other mode by pressing the appropriate direct access key.

Playback of compressed audio and Karaoke is accessible in the "Songs" mode. This mode allows to play digitally recorded WMA (MPA3) songs, MIDI songs, Karaoke songs and User songs saved during an e-DJ session.

To enter Songs mode, press the [Songs] direct access key. The LCD will display "e.Songs" in the status line and a list of available songs or song lists on the SmartMedia card to choose from. Song lists are identified by a specific icon.

To select the desired song or list, use Joystick Up/Down.

To start the playback of selected song or song list, press the play/pause key. The LCD will display the play song screen. The name of the song is scrolling in a banner in the center right part of the LCD while the audio output level is materialized by a frame around the name which size is changing following the audio level. The status line shows the elapsed time.

If the song is Karaoke song, the Lyrics are displayed at the bottom of the LCD. Note: if the song is a user song (composed with the e-DJ), the music I-way mode is entered instead of the play song mode.

To change music tempo, press Pitch/Tempo key together with joystick left to speed up or right to slow down.

To change music pitch, press Pitch/Tempo key together with joystick up to higher the pitch or down to lower it.

Press play/pause to pause the music. Press play/pause again to resume playback.

Press stop to stop the music and go back to song selection screen.

Press forward to go to next song.

Press backward to go to previous song.

Pressing the Save/Edit key in the song select screen or while a song is playing enters the song edit mode. Depending on the type of the song (user song, MIDI or WMA), different parameters can be edited.

Pressing the Save/Edit key in the song select screen while the current item is a song list enters the song list edit screen. See "Editing items" below.

Pressing forward key in the song select screen will create a new song list.

To exit Songs mode, choose any other mode by pressing the appropriate direct access key.

In the "playing samples" mode, the user can record or play voice, music or sound samples.

To enter Samples mode, press the [Samples] direct access key. The LCD will display "e.Samples" in the status line and a list of available samples or sample lists on the SmartMedia card to choose from. Sample lists are identified by a specific icon:

To select the desired sample or list, use Joystick Up/Down.

To select the desired sound effect, press Effect key together with joystick left/right.

To change the sample volume, press Effect key together with joystick up/down.

To start the playback of the selected sample, press the play/pause key. The LCD will display the play sample screen. The name of the sample is scrolling in a banner in the center right part of the LCD while the audio output level is materialized by a frame around the name which size is changing following the audio level. The status line shows the current effect.

Press stop to stop the sample and go back to sample selection screen.

Pressing the Save/Edit key in the sample select screen or while a sample is playing enters the sample edit mode.

Pressing the Save/Edit key in the sample select screen while the current item is a sample list enters the sample list edit screen. See "Editing items" below.

Pressing forward key in the sample select screen will create a new sample list.

To exit Sample mode, choose any other mode by pressing the appropriate direct access key.

Recording samples is a simple operation possible in almost any operating mode of the dB1.

Press record and keep record button down to record a sample. Release the record button to end the recording. Recording is stopped automatically if the sample duration exceeds 30 seconds.

The record source is chosen automatically depending on the operation mode.

While e-DJ is playing (I-way or U-ground modes), the record is inactive.

If no music is playing, the record source is the active microphone (built-in or docking station).

If music is playing (songs or radio), the record source is a mix of the music and the microphone input if not muted.

To enter Virtual radio mode, press the [v-Radio] direct access key. The LCD will display "v.Radio" in the status line and a list of available station presets to chose from as well as t currently tuned frequency. If no preset has been stored, only the currently tuned frequency is displayed.

To select the desired station, use Joystick Up/Down.

To listen to the selected station, press the play/pause key. The LCD will display the radio screen. The name of the radio station (or frequency if it is not a stored preset) is scrolling in a banner in the center right part of the LCD. An animation representing radio waves is also displayed. The status line shows the tuned frequency.

Use Joystick left/right to go to previous/next station is in the preset list.

Press play/pause to mute the radio.

Press stop to go back to station preset selection screen.

Press forward to tune up.

Press backward to tune down.

Pressing the Save/Edit key in the station preset selection screen enters the preset edit mode.

Pressing the Save/Edit key while a station is playing will store it in the preset list.

To exit v.Radio mode, choose any other mode by pressing the appropriate direct access key.

As long as no music is playing and in the v.Radio mode, the microphone settings are made as follows:

To change the pitch on the microphone input, press Pitch/Tempo key together with joystick up to increase the pitch or down to lower it.

To change the microphone volume, press Effects key together with joystick up/down.

To modify the microphone echo, press Effects key together with joystick left/right.

Reference is also made to co-pending U.S. application Ser. Nos. 09/690,911 and 09/691,302 filed on even date herewith for "Virtual Radio" and "Automatic Soundtrack Generator," both of which are incorporated by reference herein and both of which may utilized, alternatively, with embodiments of the present invention.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. A method of providing an interactive user experience associated with a music playback device, comprised of:
    providing a computing resource for processing music playback;
    providing a display associated with the computing resource, wherein a portion of the display displays a plurality of graphical lanes, wherein one or more of the graphical lanes corresponds to one or more music instruments, wherein the display displays animated pulses rhythmically synchronized with the music playback; and
    providing one or more user input resources suitable for user interactivity;
    wherein functions performed by at least one of the input resources are context specific to one or more of the graphical lanes.

2. The method of claim 1, wherein at least one user input resource affects a pitch changing function.

3. The method of claim 1, wherein at least one user input resource affects a tempo changing function.

4. The method of claim 1, wherein the music play back device comprises a portable handheld device including a digital signal processing resource.

5. The method of claim 1, wherein the display displays a digital light show through a TV/video interface.

6. An interactive music playback device comprising:
    a computing resource for processing music playback;
    a display comprised of a plurality of graphical lanes, wherein one or more of the graphical lanes corresponds to one or more music components, wherein a portion of the display is rhythmically synchronized with the music playback; and
    a user input device suitable for user interactivity;
    wherein functions performed by the user input device are context specific to one or more of the graphical lanes.

7. The apparatus of claim 6, wherein the user input device affects a pitch changing function.

8. The apparatus of claim 6, wherein the user input device affects a tempo changing function.

9. The apparatus of claim 6, wherein the interactive music play back device comprises a portable handheld device including a digital signal processing resource.

10. The apparatus of claim 6, wherein the display displays a digital light show through a TV/video interface.

11. A method of providing an interactive user experience associated with a music playback device, comprised of:
    providing a computing resource for processing music playback;
    providing a display associated with the computing resource, wherein a portion of the display displays a plurality of graphical areas, wherein one or more of the graphical areas corresponds to one or more music components, wherein a portion of the display displays a sound wave representation that is rhythmically synchronized with the music playback; and
    providing one or more user input resources suitable for user interactivity;
    wherein functions performed by at least one of the input resources are context specific to one or more of the graphical areas.

12. The method of claim 11, wherein at least one user input resource affects a pitch changing function.

13. The method of claim 11, wherein at least one user input resource affects a tempo changing function.

14. The method of claim 11, wherein the music play back device comprises a portable handheld device including a digital signal processing resource.

15. The method of claim 11, wherein the display displays a digital light show through a TV/video interface.

16. The method of claim 11, further comprising the steps of:
    providing a microprocessor executing a microprocessor operating program, wherein the microprocessor comprises part of the computing resource; and
    providing a download interface for receiving updates to the microprocessor operating program.

17. The method of claim 11, further comprising providing a music database stored in digital form, wherein the computing resource access the music database in accordance with the processing of music playback.

18. The method of claim 11, wherein the processing of music playback is performed based in part in accordance with a user selectable musical style.

19. The method of claim 11, further comprising providing a USB interface configured to transfer audio files.

20. The method of claim 19, wherein one ore more of the audio files is encoded in a compressed audio format.

* * * * *